(No Model.)
W. S. ROBINSON.
BALL BEARING FOR VEHICLES.
No. 599,866. Patented Mar. 1, 1898.
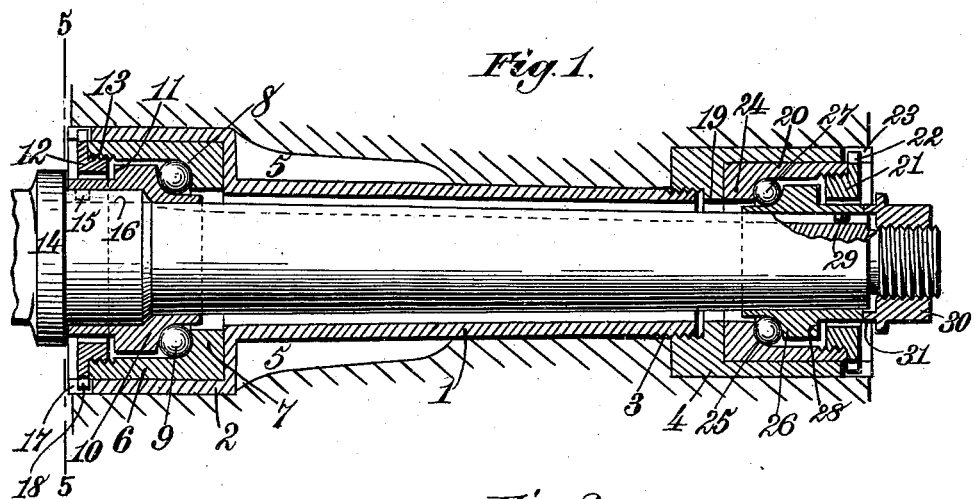
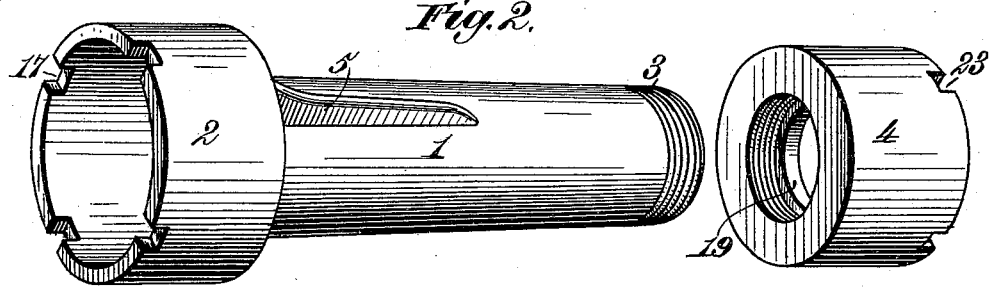
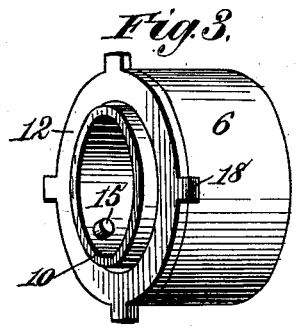
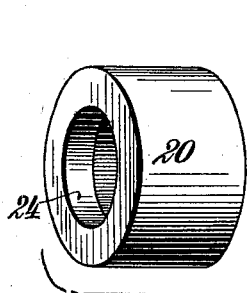
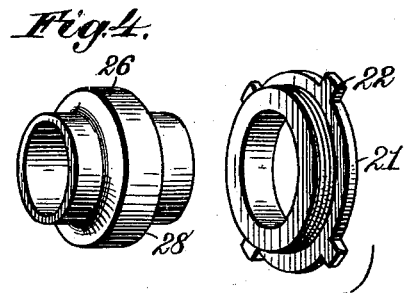
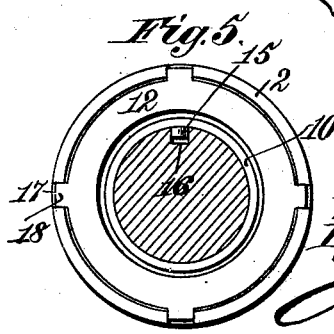
Witnesses,
Robert Everett,
F. B. Keefer
Inventor:
William S. Robinson.
By James L. Norris.
Atty.

UNITED STATES PATENT OFFICE.

WILLIAM S. ROBINSON, OF FANCY FARM, KENTUCKY.

BALL-BEARING FOR VEHICLES.

SPECIFICATION forming part of Letters Patent No. 599,866, dated March 1, 1898.

Application filed December 17, 1897. Serial No. 662,355. (No model.)

*To all whom it may concern:*

Be it known that I, WILLIAM S. ROBINSON, a citizen of the United States, residing at Fancy Farm, in the county of Graves and State of Kentucky, have invented new and useful Improvements in Ball-Bearings for Vehicles, of which the following is a specification.

This invention relates to ball-bearings for vehicle-wheels, and is in the nature of an improvement on the device for which Letters Patent were granted to me on the 25th day of December, 1894, No. 531,564.

My invention has for its object to improve and simplify the construction of such bearings, to prevent them from falling out or becoming misplaced when the wheel is removed from the axle, and to enable the bearings to be applied to ordinary axles now in use without altering or specially preparing such axles.

To these ends my invention consists in the features of construction and in their novel arrangement hereinafter described, and particularly pointed out in the claims following the description, reference being had to the accompanying drawings, forming a part of this specification, wherein—

Figure 1 is a longitudinal central sectional view illustrating my improved bearing applied to an axle-spindle. Fig. 2 is a perspective view of the hub-box and the end cap detached. Fig. 3 is a perspective view of the inner end bearing removed from the hub-box and axle-spindle. Fig. 4 is a perspective view of the parts of the outer end bearing detached, and Fig. 5 is a transverse section on the line 5 5 of Fig. 1.

Referring to the drawings, the numeral 1 indicates a hub-box provided at its inner end with an enlarged circumferential portion 2 to form a chamber for the reception of the parts of the inner bearing and threaded at its opposite or outer end, as at 3, for the reception of an annular casing or cap 4 for the reception of the parts of the outer bearing. The hub-box 1 is provided with the usual webs or ribs 5, which take into the hub when the hub-box is inserted in the latter and prevent the hub from turning on said box. Loosely arranged within the inner enlarged end 2 of the hub-box is a sleeve 6, formed at one end with an inwardly-projecting flange 7, provided interiorly with a concave raceway 8, adapted to have a rolling contact with the antifriction-balls 9. Disposed in the sleeve 6 is a cone 10, between which and the raceway 8 the balls 9 are confined and travel, and said cone is provided with an annular shoulder 11, which, when the bearing is removed from the axle-spindle, is adapted to abut a retaining-ring 12, which is screwed into the internally-threaded end 13 of the sleeve 6, and thus prevent the accidental displacement of said cone and balls. The end of the cone bears against the collar or flange 14, usually formed on the axle-spindles of vehicles, and is prevented from rotating independently of said spindle by a lug 15, which is formed with or fitted in the cone and engages a groove 16, formed longitudinally on the spindle. The end of the enlarged portion 2 of the hub-box is provided with a plurality of notches or recesses 17, into which are adapted to fit lugs 18, projecting radially from the periphery of the retaining-ring 12, by which means the sleeve 6 is prevented from rotating independently of the hub-box when the parts are in operative position.

Upon the opposite end of the axle-spindle is arranged a bearing constructed substantially like that just above described. The annular cap or casing 4 is provided with an interior shoulder 19, and loosely fitted in said cap is a sleeve 20, corresponding in all respects, excepting its size, to the sleeve 6, before described. Screwed into the threaded end of the sleeve 20 is a retaining-ring 21, which is provided with radially-projecting lugs 22, arranged to fit into notches or recesses 23, formed in the end of the cap 4 and prevent the sleeve 20 from rotating independently of the cap 4. The inner end of the sleeve 20 is provided with an inwardly-projecting flange 24, having formed on its face a concave raceway 25. The inner end of the sleeve 20 abuts the shoulder 19, formed on the interior of the cap 4. Disposed within the sleeve 20 is a cone 26, between which and the raceway 25 the antifriction-balls 27 are confined and travel. Said cone 26 is provided with a shoulder 28, which, when the hub is removed from the wheel, is adapted to engage the retaining-ring 21, and thus prevent the accidental displacement of the cone and balls.

The cone 26 is provided with an internally-projecting lug 29, which engages the corresponding groove in the axle-spindle and prevents the cone from rotating independently of said spindle.

The end of the axle-spindle is threaded, as usual, and over said threaded end is adapted to be screwed an axle-nut 30, which is provided with an annular flange 31 on its inner face that bears against the end of the cone 26.

The hub-box 1 is driven into the hub in the usual manner, and the cap 4 is then placed over its threaded end and screwed up tight, thus drawing the axle-box firmly into place in the hub. The balls 9 are dropped into their raceway 8 in the sleeve 6, the cone 10 is next inserted in place, and the retaining-ring 12 is then screwed into the end of the sleeve, holding the balls and cone in position. In like manner the sleeve 20, cone 26, balls 27, and retaining-ring 21 are assembled together. To place the hub on the axle-spindle, the cone 10, carrying with it the sleeve 6, retaining-ring 12, and balls 9, is slipped on the axle-spindle until it bears against the flange 14, with its lug 15 engaging the groove 16 in the axle-spindle, by means of which latter it is prevented from turning on the spindle. The hub and hub-box are then slipped over the axle-spindle and the sleeve 6 and turned thereon until the lugs 18 on the retaining-ring enter and engage the notches or recesses 17, formed in the end of the hub-box. The cone 26, together with the sleeve 20, retaining-ring 21, and balls 27, is then slipped over the end of the axle-spindle and within the cap 4 until the inner end of the sleeve abuts the shoulder 19 of the cap. The axle-nut 30 is then screwed over the threaded end of the axle-spindle, holding all the parts securely in position.

It will be noted that the end of the cone 10 bears against the flange 14 on the axle-spindle, thus preventing the retaining-ring 12 from coming in contact with said flange, and as the cone is fixed relatively to the axle-spindle there can be no friction between the parts at this point. In like manner the axle-nut 30 impinges against the end of the non-rotating cone 26, and thus there can be no friction at this point. In fact, none of the parts carried by the hub-box contact with either the axle-spindle or any of the parts carried thereby, the sole points of contact being with the balls, by which means the friction is reduced to a minimum. When it becomes necessary to tighten up the parts to compensate for wear, the impact of the nut is taken up by the non-rotating cone 26 and by the end of the non-rotating cone 10 abutting the flange 14 of the axle-spindle, thus again avoiding any frictional contact between moving parts.

When it becomes necessary to remove the wheel from the axle for the purpose of repair, cleaning, or for any other purpose, the nut 30 is unscrewed and the hub drawn off from the axle-spindle together with the bearing contained in the cap 4, leaving the bearing incased within the sleeve 6 upon the axle-spindle. After the wheel has been removed the sleeve 20 and its contained parts can be slipped from without the hub-box and set aside in a safe place. In this manner the adjustment of the bearings is not altered, the balls are not taken out, nor the parts of the bearing disturbed in any manner, the whole remaining intact and secure against loss or the entrance of dirt.

It will also be observed that the bearings can be applied to a hub and axle-spindle such as are in ordinary use, it not being necessary to alter, manipulate, or prepare the axle-spindle in any manner whatsoever, and as the balls and none of the moving parts come in contact with the axle-spindle the bearings may be applied to an old and worn axle-spindle as readily as to a new one.

As it is a common practice to make vehicle axle-spindles according to standard sizes, it is merely necessary to make the bearings of corresponding sizes to fit the same.

I have described the enlarged end of the hub-box and the cap 4 as each being provided with a plurality of notches or recesses and the retaining-rings provided with a like number of lugs for engaging said notches or recesses; but it will be evident that only one lug may be provided for each retaining-ring to engage either of the corresponding notches or recesses or that only one notch may be formed in the enlarged end of the hub-box and in the cap. However, to facilitate assembling the parts and for the sake of strength I prefer the construction shown.

Having described my invention, what I claim is—

1. In a ball-bearing for vehicles, the combination with the hub-box having one end circumferentially enlarged and provided with a notch, of an annular cap screwed over the other end of said hub-box and provided with a notch, sleeves loosely fitted in said enlarged end and cap and each provided with a concave raceway, a cone fitted in each of said sleeves, antifriction-balls confined between the cones and raceways, retaining-rings screwed into the ends of said sleeves and provided with lugs engaging the said notches, and means for preventing the cones from turning on the axle-spindle, substantially as described.

2. In a ball-bearing for vehicles, the combination with the hub-box having one end circumferentially enlarged and provided with a notch, of an annular cap screwed over the other end of said hub-box and provided with a notch, a sleeve loosely fitted in said enlarged end and in said cap and each provided with a concave raceway, a cone fitted in each of said sleeves, antifriction-balls confined between the cones and raceways, retaining-rings screwed into the ends of said sleeves and provided with lugs engaging the said notches, and means for preventing the cones from turning on the axle-spindle, the end of the inner cone projecting beyond the corresponding retaining-ring and arranged to engage the axle-spindle flange or collar, substantially as described.

3. In a ball-bearing for vehicles, the combination with the hub-box having one end circumferentially enlarged and provided with a notch, of an annular cap screwed over the other end of said hub-box and provided with a notch, a sleeve loosely fitted in said enlarged end and in said cap and each provided with a concave raceway, a cone fitted in each of said sleeves, antifriction-balls confined between the cones and raceways, retaining-rings screwed into the ends of said sleeves and provided with lugs engaging the said notches, means for preventing the cones from turning on the axle-spindle, the end of the inner cone projecting beyond the corresponding retaining-ring and arranged to engage the axle-spindle flange or collar, and a nut adapted to be screwed over the end of the axle-spindle and provided on its inner face with an annular flange arranged to engage the end of the outer cone, substantially as described.

4. In a ball-bearing for vehicles, the combination with the hub-box having one end circumferentially enlarged and provided with a notch, of an annular cap screwed over the other end of said hub-box and provided with a notch, a sleeve loosely fitted in said enlarged end and in said cap and each provided with a concave raceway, a cone fitted in each of said sleeves, antifriction-balls confined between the cones and raceways, annular shoulders formed on said cones, retaining-rings screwed into the ends of the sleeves outside of said shoulders and provided with lugs engaging the said notches, and means for preventing the cones from turning on the axle-spindle, substantially as described.

5. In a ball-bearing for vehicles, the combination with the hub-box having one end circumferentially enlarged and provided with a notch, of an annular cap screwed over the other end of said hub-box and provided with a notch, sleeves loosely fitted in said enlarged end and cap and each provided with a concave raceway, a cone fitted in each of said sleeves and each provided with an interior lug adapted to engage a corresponding groove in the axle-spindle to prevent the cones from turning on the spindles, antifriction-balls confined between the raceways and cones, and retaining-rings screwed into the ends of said sleeves and provided with lugs engaging the said notches to prevent the sleeves from turning independently of the hub-box, substantially as described.

In testimony whereof I have hereunto set my hand in presence of two subscribing witnesses.

WILLIAM S. ROBINSON.

Witnesses:
    EWELL A. DICK,
    F. B. KEEFER.